United States Patent [19]
Jung et al.

[11] Patent Number: 5,690,005
[45] Date of Patent: Nov. 25, 1997

[54] TOOL FOR REMOTELY INSTALLING AND TORQUING TIE ROD NUT WITH LIMITED VERTICAL ACCESS

[75] Inventors: Wing G. Jung, Cupertino; John Allan Sies, San Jose, both of Calif.

[73] Assignee: General Electric Company, San Jose, Calif.

[21] Appl. No.: 532,201

[22] Filed: Sep. 22, 1995

[51] Int. Cl.$^6$ .................................................. B25B 17/00
[52] U.S. Cl. ............................ 81/57.3; 81/57.24; 81/461
[58] Field of Search ......................... 81/57.3, 57, 57.24, 81/57.4, 57.42, 57.14, 467, 469, 470, 461, 53.1, 177.75, 429

[56] References Cited

U.S. PATENT DOCUMENTS

| | | | |
|---|---|---|---|
| 1,042,736 | 10/1912 | Wildmo | 81/57.3 |
| 1,263,435 | 4/1918 | Klingbiel | 81/57.3 |
| 1,346,505 | 7/1920 | Mitchell | 81/57.3 |
| 1,537,657 | 5/1925 | Burch | 81/177.75 |
| 3,861,244 | 1/1975 | MacDonald | 81/57.31 |
| 4,254,674 | 3/1981 | Strussion et al. | 81/57.3 |
| 4,630,512 | 12/1986 | Duff | 81/429 |
| 5,072,633 | 12/1991 | Smith | 81/57.3 |
| 5,272,943 | 12/1993 | Edwards | 81/461 |

*Primary Examiner*—James G. Smith
*Assistant Examiner*—Joni B. Danganan
*Attorney, Agent, or Firm*—James E. McGinness; Dennis M. Flaherty

[57] ABSTRACT

A tool for installing and torquing a tensioning nut onto a tie rod of a shroud repair apparatus. The nut torquing tool has a socket for coupling with the tensioning nut and an adaptor for coupling with a manually operated handling pole, wherein the axis of rotation of the socket is radially displaced relative to the axis of rotation of the adaptor. The respective shafts connected to the socket and adaptor are coupled by means of a pair of sprockets and a chain which convert rotation of the adaptor into rotation of the socket. The distance between the sprockets can be adjusted to tension the chain. The handling pole adaptor is connected to a drive shaft by way of a universal joint, a torque limiter and a torque multiplier. Incorporation of a torque multiplier facilitates installation and torquing of the tensioning nut in a single operation using a lightweight handling pole.

20 Claims, 7 Drawing Sheets

TOOL FOR REMOTELY INSTALLING AND TORQUING TIE ROD NUT WITH LIMITED VERTICAL ACCESS

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

Figure 1:
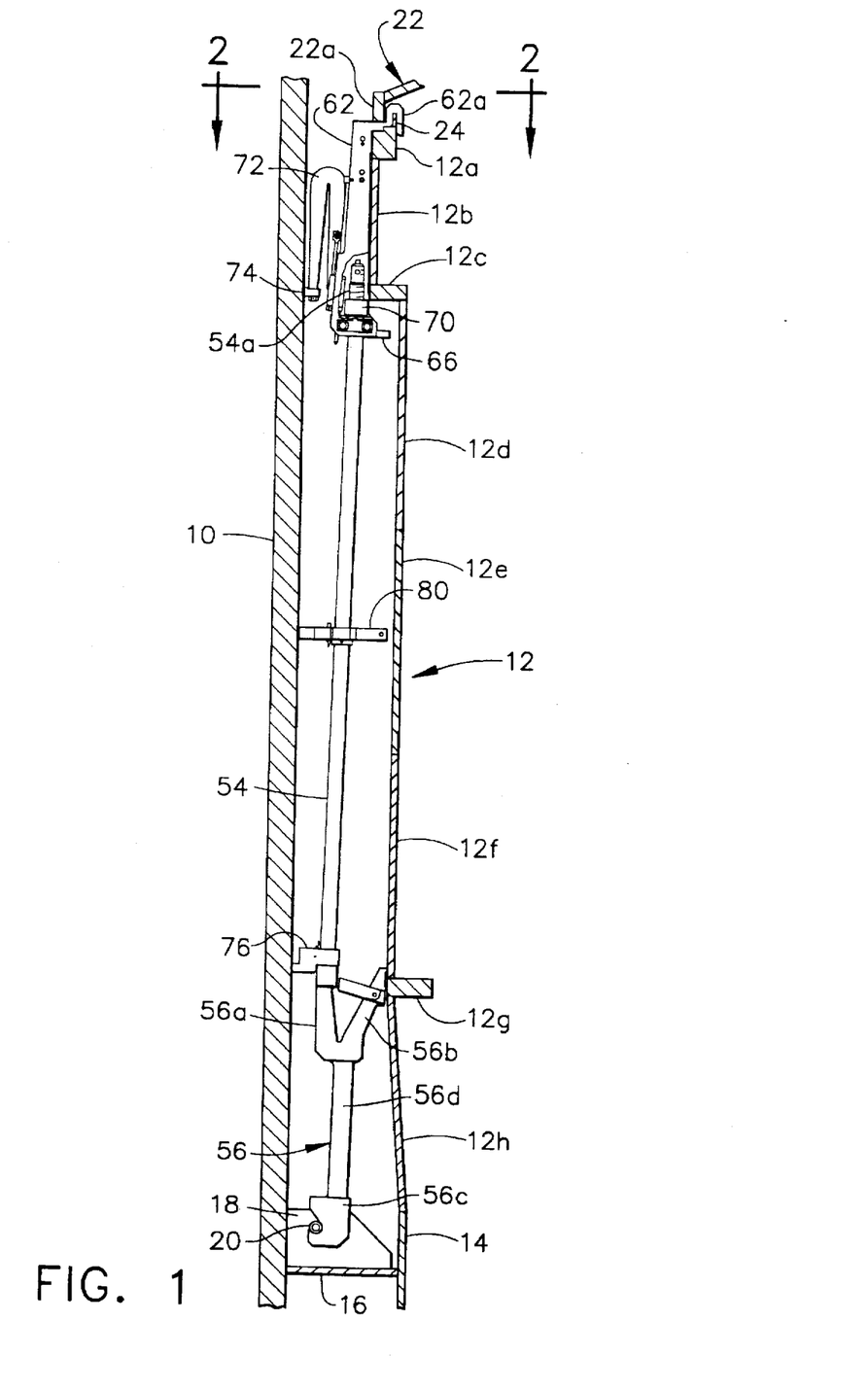
FIG. 1 is an elevational view of core shroud repair apparatus comprising a tie rod assembly for vertically restraining the shroud and wishbone springs for laterally restraining the shroud at the elevations of the top guide support ring and the core plate.

As seen in FIG. 1, a conventional boiling water reactor has a reactor pressure vessel (RPV) 10 and a core shroud 12 arranged concentrically in the RPV with an annular region (namely, the downcomer annulus) therebetween. The core shroud 12 is a stainless steel cylinder surrounding the nuclear fuel core (not shown). The core is made up of a plurality of fuel bundle assemblies. Each array of fuel bundle assemblies is supported at the top by a top guide and at the bottom by a core plate. During operation of the reactor, water is continuously recirculated down the downcomer annulus and then up through the core. This flow is induced by a multiplicity of jet pumps (not shown) located in the downcomer annulus and driven by recirculation pumps (not shown) outside the reactor pressure vessel.

The core shroud 12 comprises a shroud head flange 12a for supporting the shroud head 22; a circular cylindrical upper shroud wall 12b having a top end welded to shroud head flange 12a; an annular top guide support ring 12c welded to the bottom end of upper shroud wall 12b; a circular cylindrical middle shroud wall comprising three sections 12d, 12e and 12f welded in series, with a top end of section 12d being welded to top guide support ring 12c; and an annular core plate support ring 12g welded to the bottom end of middle shroud wall section 12f and to the top end of a lower shroud wall 12h. The entire shroud is supported by a shroud support 14, which is welded to the bottom of lower shroud wall 12h, and by annular shroud support plate 16, which is welded at its inner diameter to shroud support 14 and at its outer diameter to RPV 10.

In the event of a seismic disturbance, it is conceivable that the ground motion will be translated into lateral deflection relative to the reactor pressure vessel of those portions of the shroud located at elevations above shroud support plate 16. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 12, which vertically and horizontally supports the core top guide and the shroud head 22. In particular, a cracked shroud increases the risks posed by a loss-of-coolant accident (LOCA). During a LOCA, the loss of coolant from the reactor pressure vessel produces a loss of pressure above the shroud head 22 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A known repair method for vertically restraining a weakened core shroud utilizes tensioned tie rods coupled to the shroud flange 12a and to the shroud support plate 16, as seen in FIG. 1. In addition, the shroud is restrained laterally by installation of wishbone springs which, along with the tie rod, are components of the shroud repair assembly. During repair of the shroud, the respective components of the repair assembly must be lowered from the refueling bridge into the annulus for installation in sequence. Nuts and bolts required for assembly are installed remotely. In particular, a tensioning nut must be installed on the threaded upper end of the tie rod. The shroud restraint apparatus shown in FIG. 1 includes an upper support assembly having a top support bracket which limits the vertical access to the top of the tie rod. In a modification of this shroud restraint apparatus, vertical access to the top of the tie rod is limited by core spray piping which penetrates the upper shroud wall 12b. Thus, there is a need for a nut torquing tool which can be operated manually and remotely to effect installation and torquing of the tie rod tensioning nut when vertical access is limited.

SUMMARY OF THE INVENTION

The present invention is a tool for installing and torquing a tensioning nut onto a tie rod of a shroud repair apparatus. The torquing tool has a socket for coupling with the tensioning nut and an adaptor for coupling with a manually operated handling pole. The axis of rotation of the socket is radially displaced relative to the axis of rotation of the adaptor, which feature enables the nut to be torqued despite limited vertical access. Respective shafts connected to the socket and adaptor are coupled by means of a pair of sprocket wheels and a chain which convert rotation of the handling pole into socket rotation. The distance between the sprocket wheel axes of rotation can be adjusted to tension the chain.

In accordance with the preferred embodiment, the handling pole adaptor is connected to a drive shaft by way of a universal joint, a torque limiter and a torque multiplier, which are coupled in sequence. The universal joint allows the handling pole to be tilted by the operator standing on the refueling bridge, if need be, to avoid an obstruction, such as the feedwater sparger or the core spray piping which limit vertical access to the downcomer annulus. The torque limiter releases the coupling between the socket and adaptor when the desired torque has been applied to the tensioning nut. The torque multiplier multiplies the torque being applied at the adaptor by the operator handling the handling pole. By proper selection of the torque multiplier ratio, a desired torque on the tensioning nut can be applied using the nut torquing tool of the present invention. Incorporation of a torque multiplier facilitates installation and torquing of the tensioning nut in a single operation using a lightweight handling pole.

DETAILED DESCRIPTION OF THE PREFERRED EMBODIMENTS

Referring to FIG. 1, a shroud restraint tie rod assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 12c. The upper end of tie rod 54 has a threaded portion.

The lower spring 56 is anchored to a gusset plate 18 attached to the shroud support plate 16. The lower spring 56 has a slotted end which straddles gusset plate 18 and forms a clevis hook 56c. The clevis hooks under opposite ends of a clevis pin 20 inserted through a hole machined in the gusset plate 18. Engagement of the slotted end with the gusset plate 18 maintains alignment of lower spring 56 under the action of seismic motion of the shroud, which may be oblique to the spring's radial orientation.

The tie rod 54 is supported at its top end by an upper support assembly which hangs on the shroud flange. A pair of notches or slots are machined in the shroud head ring 22a of shroud head 22. The notches are positioned in alignment with a pair of bolted upper support plate segments 62 of the upper support assembly when the shroud head 22 is properly seated on the top surface of shroud flange 12a. These notches facilitate the coupling of the tie rod assembly to the shroud flange.

The pair of notches at each tie rod azimuthal position receive respective hook portions 62a of the upper support plates 62. Each hook 62a conforms to the shape of the top surface of shroud flange 12a and the shape of the steam dam 24. The distal end of hook 62a hooks on the inner circumference of shroud dam 24.

The upper support plates 62 are connected in parallel by a top support bracket 64 (see FIGS. 2 and 3B) and a support block 66 which forms the anchor point for the top of the tie rod. Support block 66 has an unthreaded bore 68 (see FIG. 3B), tapered at both ends, which receives the upper end of tie rod 54.

Figure 4:
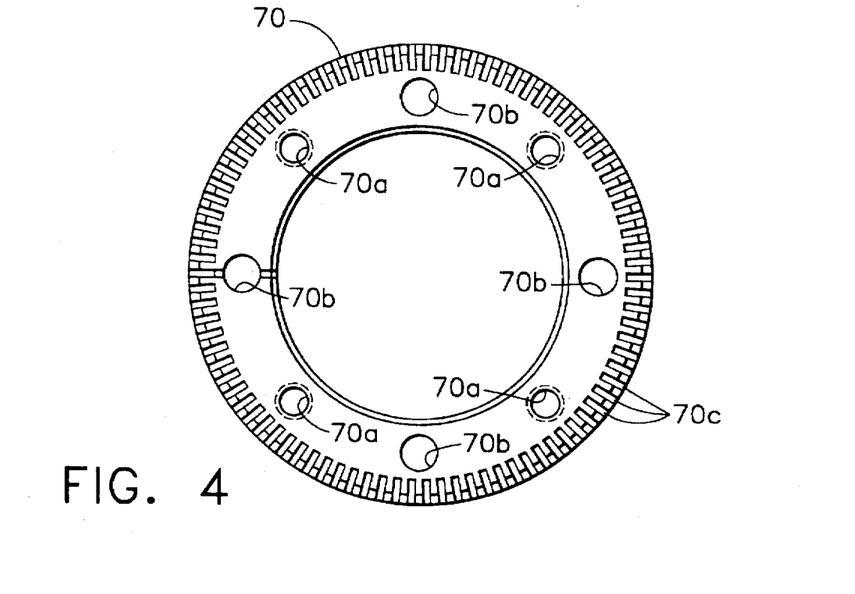
FIG. 4 is a plan view of the tie rod tensioning nut incorporated in the core shroud repair apparatus shown in FIG. 1.

After the upper end of tie rod 54 has been passed through bore 68, a threaded tensioning nut 70 is screwed onto the threaded portion 54a of tie rod 54. As shown in FIG. 4, tensioning nut 70 has four threaded axial holes 70a circumferentially distributed at equiangular intervals on the top surface thereof. The nut torquing tool of the present invention (described in detail below) is coupled to tensioning nut 70 by means of a corresponding plurality of bolts which are screwed into holes 70a. The nut 70 further has four unthreaded axial holes 70b circumferentially distributed at equiangular intervals on the top surface thereof for engagement with mating portions of the nut torquing tool. The peripheral edge of the top surface of nut 70 has a multiplicity (e.g., 90) of spaced radial slots 70c, one of which can be engaged by a key (not shown) to lock the nut against vibration-induced detorquing.

The assembly comprised of support plates 62 with hooks 62a, support block 66, tie rod 54, lower spring 56, clevis pin 20 and gusset plate 18 form a vertical load path by which the shroud flange 12a is connected to the shroud support plate 16. In the tensioned state, upper support plates 62 exert a restraining force on the top surface of the shroud flange 12a which opposes separation of the shroud at any assumed failed circumferential weld location.

Lateral restraint at the elevation of the top guide support ring 12c is provided by an upper spring 72 having a double cantilever "wishbone" design. The end of the radially outer spring arm has an upper contact spacer 74 rotatably mounted thereon which bears against the inner surface of the RPV wall 10. Upper spring 72 is installed after installation of the upper support assembly and tensioning of nut 70.

The spring arm 56a of lower spring 56 laterally supports the shroud 12 at the core plate support ring 12g, against the vessel 10, via a lower contact spacer 76. The top end of spring arm 56a has a threaded bore to provide the attachment for the bottom of the tie rod 54. The member 56d connecting the upper wishbone spring 56a, 56b to the clevis hook 56c is offset from the line of action between the lower end of tie rod 54 and the clevis pin 20 to provide a vertical spring compliance in the load path to the tie rod.

A middle support 80 is preloaded against the vessel wall at assembly by radial interference which bends the tie rod 54, thereby providing improved resistance to vibratory excitation failure of the tie rod.

Figure 2:
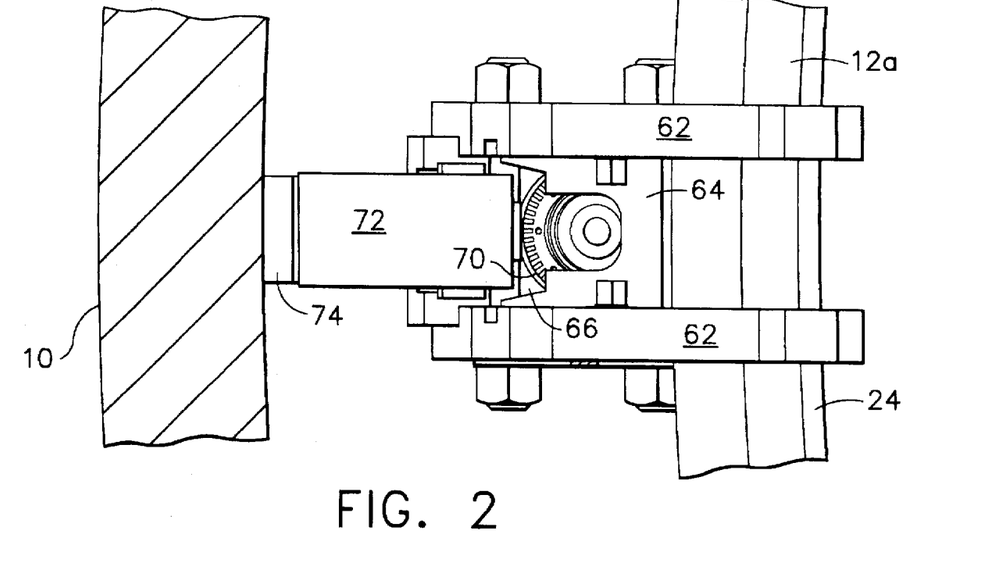
FIG. 2 is a plan view of the core shroud repair apparatus shown in FIG. 1, taken from above the shroud flange with the shroud head removed.
Figures 3A, 3B:
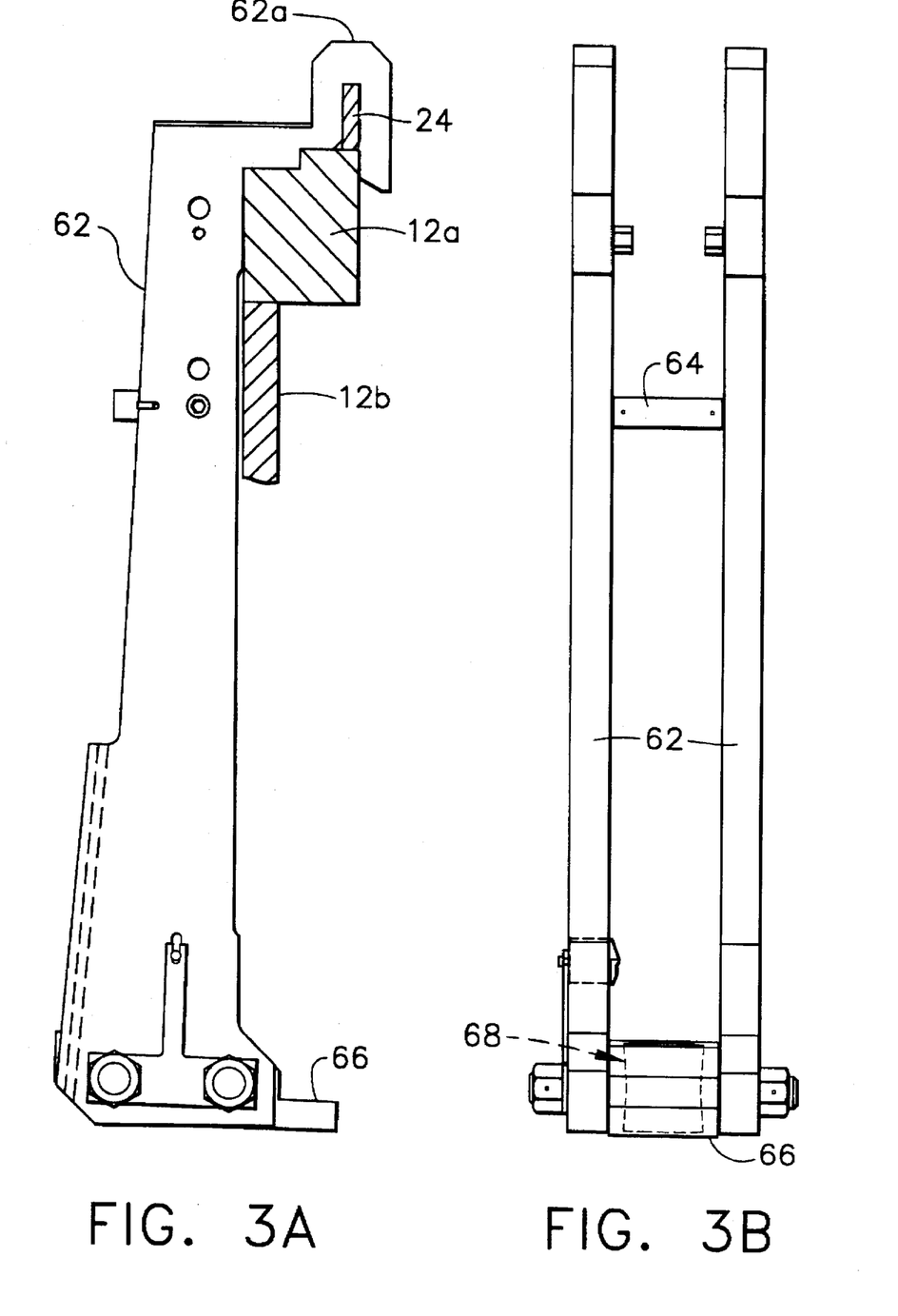
FIGS. 3A and 3B are rear and side elevation views respectively of the upper support assembly incorporated in the core shroud repair apparatus shown in FIG. 1.

The tensioning nut 70 is screwed onto the threaded upper end of tie rod 54 before upper lateral restraint spring 72 is installed. As best seen in FIGS. 2 and 3B, vertical access to the tensioning nut is limited by the top support bracket 64 of the upper support assembly. In accordance with the present invention, the top support bracket 64 is circumvented by the use of a specially designed nut torquing tool which enables an operator standing on the refueling bridge to install and torque the tensioning nut 70 by manipulation of a handling pole.

Figures 5, 8:
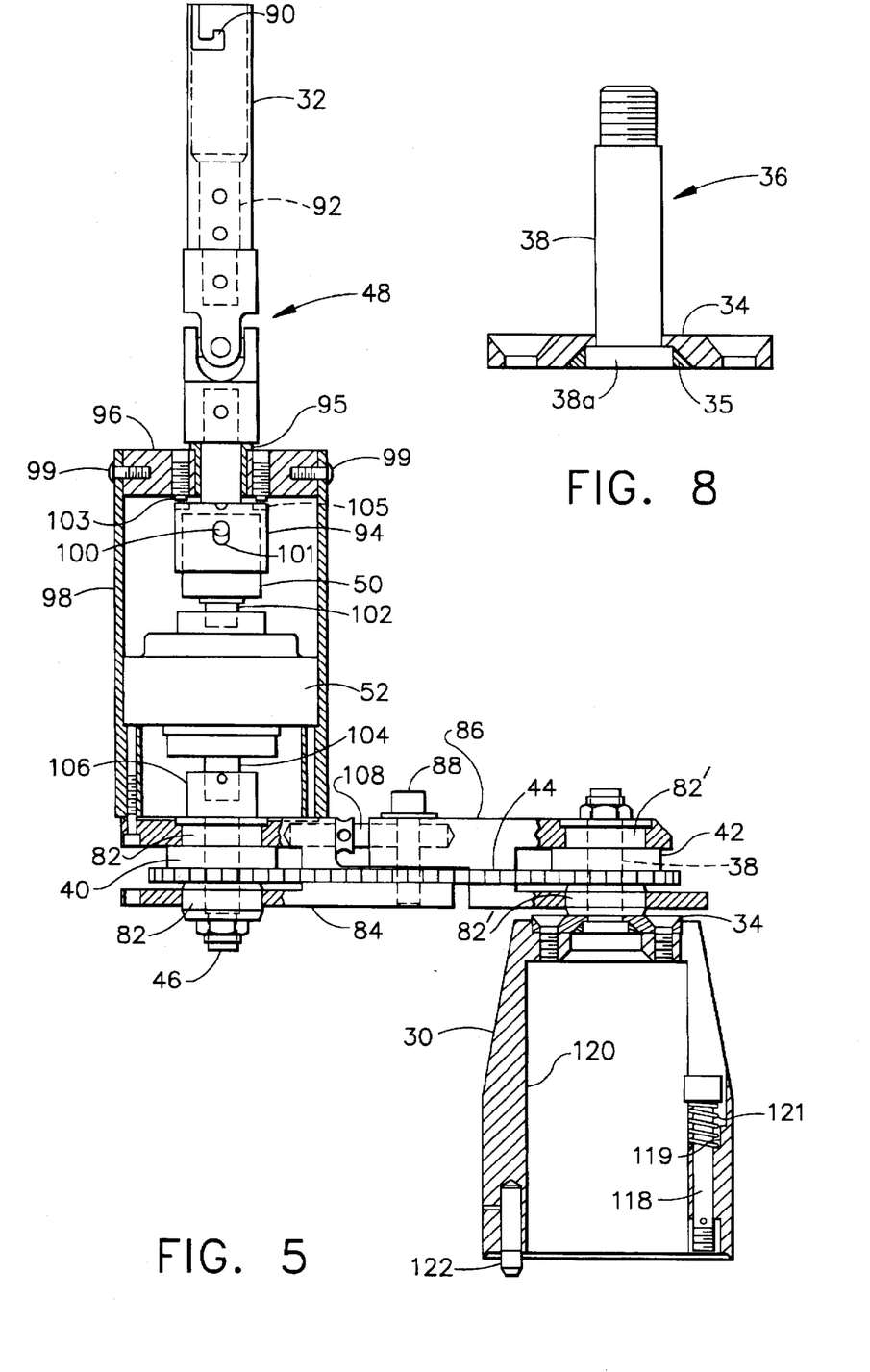
FIG. 5 is a sectional view of the nut torquing tool in accordance with a preferred embodiment of the invention.
FIG. 8 is an elevation view of the axial weldment incorporated in the nut torquing tool shown in FIG. 5.

Referring to FIG. 5, the nut torquing tool in accordance with the preferred embodiment comprises a nut driver 30 for coupling with the tensioning nut and an adaptor 32 for coupling with a manually operated handling pole. Nut driver 30 is mounted on a circular plate 34 of an axial weldment 36 (see FIG. 8). The circular plate 34 is welded to a shaft 38, which is driven to rotate in response to rotation of a drive shaft 46 by a chain-sprocket arrangement (described in detail below).

In accordance with the preferred embodiment of the invention, drive shaft 46 is coupled to the handling pole adaptor 32 by way of a universal joint 48, a torque limiter 50 and a torque multiplier 52. The adaptor 32 has a pair of J-shaped slots 90 (only one of which is shown in FIG. 5) which receive and interlock with a corresponding pair of pins (not shown) on the lower end of a handling pole. The upper end of the handling pole is manipulated by an operator standing on the refueling bridge. The universal joint 48 allows the handling pole to be tilted by the operator. The torque limiter 50 is preset to release when a predetermined torque is applied at the input shaft thereof via the service. The torque multiplier 52 multiplies the torque being applied at adaptor 32.

In accordance with the preferred embodiment of the invention, the torque multiplier ratio is 5:1. However, other torque multiplier ratios can be selected depending on the specific tie rod tension desired. In an exemplary installation, the final torque applied to the tensioning nut was 175 ft-lb. In the absence of the torque multiplier, the operator in this instance would require a cumbersome handling pole capable of withstanding a torque input of 175 ft-lb. However, incorporation of a 5:1 torque multiplier in the nut torquing tool enables the operator to use a lightweight handling pole which need only withstand a torque input of 35 ft-lb. In particular, the operator can use a handling pole made from 1-inch-diameter aluminum tubing, such pole being lightweight and easy to manipulate.

The upper coupling of the universal joint 48 is coupled to the adaptor 32 by an upper extension 92. The lower coupling of universal joint 48 is coupled to the torque limiter 50 by a lower extension 94. The midportion of lower extension 94 is slidably supported by a flanged sleeve bearing 95 mounted in a central hole in a disk 96. Disk 96 is secured in the upper end of a support post 98 via a plurality of screws 99. The support post 98 is a circular cylindrical tube which supports the torque multiplier 52 and the torque limiter connected thereto. The torque limiter 50 has an adaptor 102 which couples to the torque multiplier 52. Similarly, torque multiplier 52 has an adaptor 104 which couples to a square socket 106 on the upper end of drive shaft 46.

A first subassembly formed by pole adaptor 32, universal joint 48 and lower extension 94 is axially translatable relative to a second subassembly formed by disk 96, support post 98, torque multiplier 52 and torque limiter 50 between a first position whereat the first subassembly cannot rotate relative to the second subassembly and a second position whereat the first subassembly is rotatable relative to the second subassembly. When the tool is lifted, the force of gravity translates the second subassembly downward relative to the first subassembly, i.e., the first subassembly is in the first position where rotation is blocked. This position is maintained as the tool is lowered into the annulus on the end of a handling pole. When the tensioning nut bears against the threads on the upper end of the tie rod, further lowering of the handling pole causes the first subassembly to translate downward relative to the second subassembly into the second position, whereat the first subassembly can be rotated relative to the second subassembly and the tie rod tensioning nut can be torqued.

During translation of the lower extension 94 relative to disk 96, rotational coupling of lower extension 94 and torque limiter 50 is maintained by a dowel pin 100 inserted in a diametral bore of the torque limiter. Dowel pin 100 has opposing ends which ride in opposing axial slots 101 formed in the lowermost portion of the lower extension 94. The lowermost portion of lower extension 94 also has an axial circular cylindrical recess for receiving the upper portion of the torque limiter 50. Slots 101 communicate with the axial recess in the lower extension. The respective ends of slots 101 determine the limits of travel of lower extension 94 relative to torque limiter 50.

When the lower extension 94 is in its lowermost position relative to the torque limiter (as shown in FIG. 5), lower extension 94 is free to rotate in sleeve bearing 95, thereby driving rotation of the nut driver 30. However, when the lower extension 94 is raised to its uppermost position by lifting the handling pole, a plurality of stubby plungers 103 protruding from disk 96 engage a corresponding plurality of grooves 105 formed in the upper annular surface of the lowermost portion of lower extension 94. This engagement locks the lower extension relative to the support post 98, preventing rotation of the lower extension inside the sleeve bearing. In this state of engagement, the entire tool assembly can be rotated by rotating the handling pole, thereby facilitating proper positioning of the tool.

In the torquing mode, the driven shaft 38 is rotated in response to rotation of drive shaft 46 by a chain- and-sprocket arrangement comprising sprocket wheels 40 and 42 and chain 44. The sprocket wheel 40 is mounted on drive shaft 46; the sprocket wheel 42 is mounted on driven shaft 38. Drive shaft 46 is rotatably supported by a first pair of ball bearings 82 mounted in a center bracket 84; driven shaft 36 is rotatably supported by a second pair of ball bearings 82 mounted in an offset bracket 86.

Figure 6A:
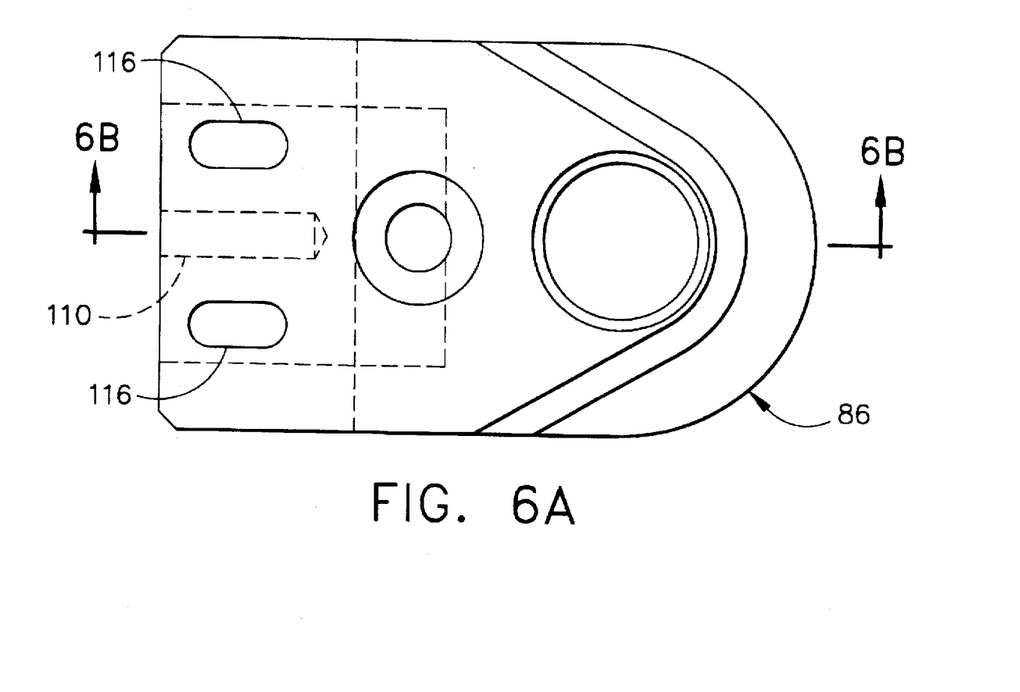
FIG. 6A and 6B are plan and sectional views of the offset bracket incorporated in the nut torquing tool shown in FIG. 5.
Figure 6B:
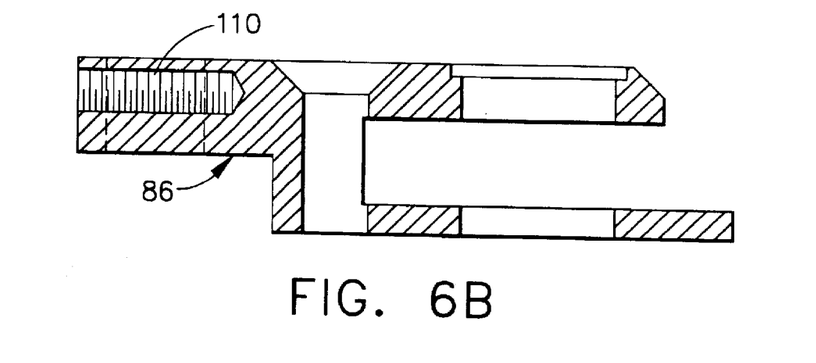
Figure 7A:
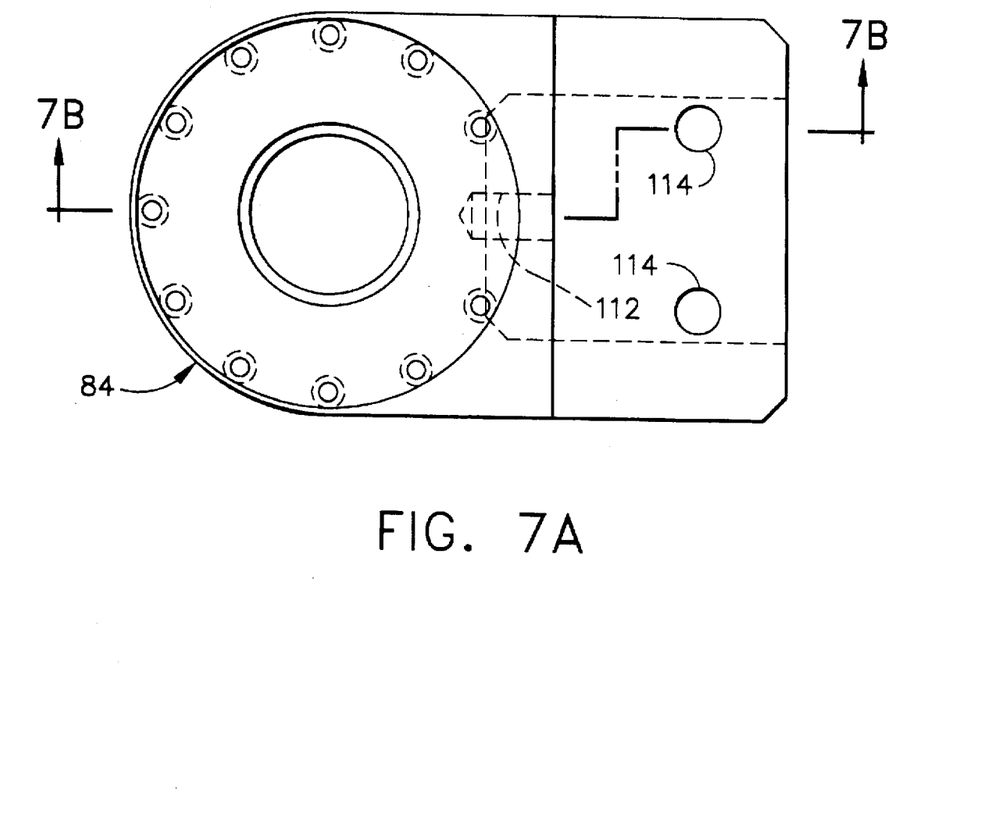
FIGS. 7A and 7B are plan and sectional views of the center bracket incorporated in the nut torquing tool shown in FIG. 5.
Figure 7B:
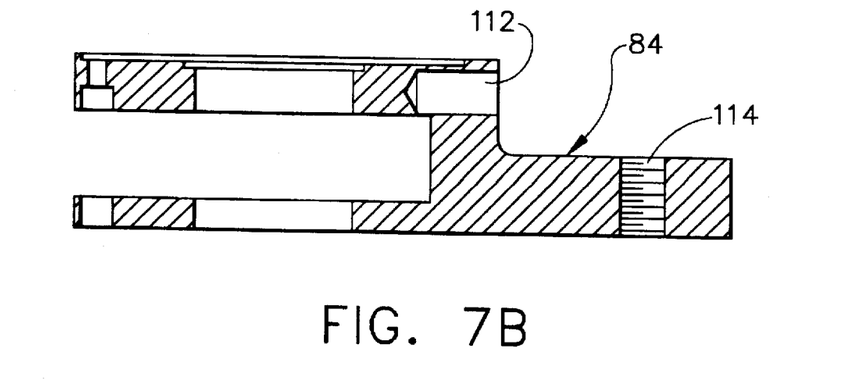

The center bracket 84 and offset bracket 86 are coupled by a pair of socket head screws 88 to form an extension arm. As a result of this arrangement, drive shaft 46 is displaced relative to driven shaft 38, which facilitates circumvention of an obstruction, such as top support bracket 64 (see FIG. 3B), that limits vertical access to the tie rod tensioning nut 70. The bracket coupling is adjustable to allow the chain 44 to be tensioned before the nut torquing tool is lowered into the reactor pressure vessel. This adjustment is facilitated by a stud 108 having a threaded shaft that screws into a threaded horizontal bore 110 (see FIG. 6A) formed in the offset bracket 86 and an unthreaded shaft that screws into an unthreaded horizontal bore 112 (see FIG. 7A) formed in the center bracket 84. The stud allows the center and offset brackets to slide relative to each other when the screws 88 are unscrewed from the respective threaded holes 114 formed in center bracket 84. When screws 88 are removed, stud 108 can slide in unthreaded bore 112, thereby producing relative translation of the center and offset brackets and consequent adjustment of the chain tension. When the desired chain tension is attained, screws 88 are screwed into threaded holes 114 to rigidly secure the brackets together. The shaft of each screw 88 penetrates a corresponding slot 116 in offset bracket 86. Slots 116 allow offset bracket 86 to be attached to center bracket 84 at various positions within a range equal to the difference between the length of slot 116 and the diameter of the shaft of screw 88.

The tensioning nut is attached to nut driver 30 by a pair of screws 118 (only one of which is shown in FIG. 5) which threadably engage two of the four threaded holes 70a in nut 70 (see FIG. 4). These screws hold the nut on the tool while the tool is being lowered into the annulus and positioned so that the nut is slid onto the upper end of the tie rod 54 (see FIG. 1). Each screw is slidably arranged in a vertical circular cylindrical hole. An offset 119 forms a seat for a compression spring 121 which opposes downward displacement of screw 118, as shown in FIG. 5. Nut driver 30 also has an axial circular cylindrical recess 120 for receiving the upper end of the tie rod as the nut 70 travels down the threaded upper portion thereof. Torque is transferred from the nut driver to the nut via four dowel pins 122 (only one of which is shown in FIG. 5) distributed at equal angular intervals, which dowel pins slide in the unthreaded holes 70b (see FIG. 4) in nut 70. A desired final torque $T_f$ is attained by applying an input torque $T_{in}$ at the upper end of the handling pole, wherein $T_f = mT_{in}$ and m is the torque multiplier ratio. To remove the nut torquing tool upon completion of the nut torquing operation, screws 118 must be unscrewed by remote operation of a handling pole having a tool suitable for this purpose. After the nut 70 has been disengaged from the nut driver 30, the nut torquing tool is lifted out of the annulus and may be moved to the azimuthal position of the next shroud repair assembly requiring tie rod nut torquing.

Figure 9:
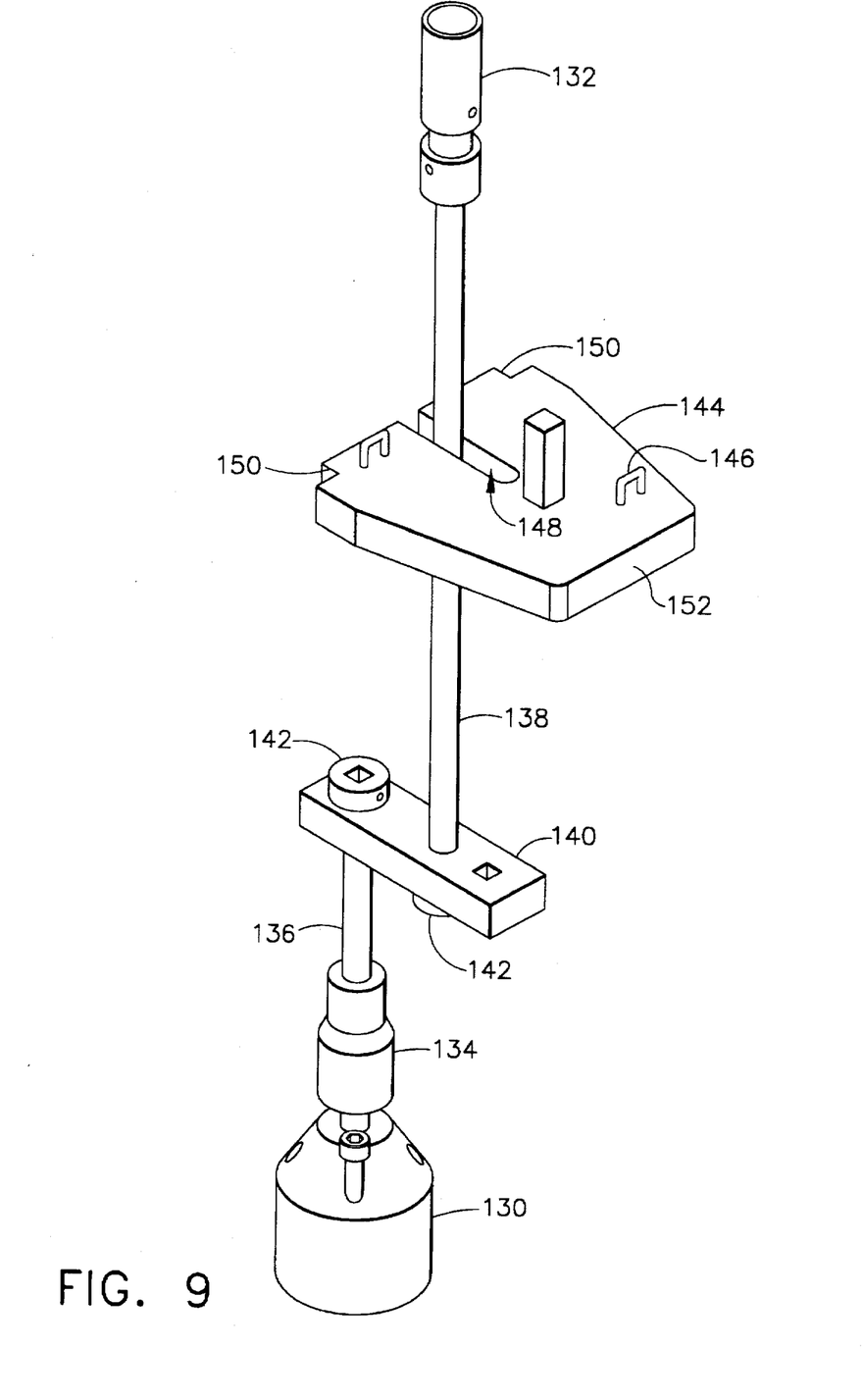
FIG. 9 is an isometric view of a nut torquing tool in accordance with an alternative preferred embodiment of the invention.

In accordance with an alternative embodiment of the invention shown in FIG. 9, the nut torquing tool comprises a nut driver 130 for coupling with the tensioning nut and an adaptor 132 for coupling with a manually operated handling pole. Nut driver 130 is mounted to the output half of a universal joint 134. The input half of universal joint 134 is mounted to the lower end of an extension 136 which serves as the driven shaft. Another extension 138, which serves as the drive shaft, has its upper end coupled to the pole adaptor 132. Extension 136 is driven to rotate in response to rotation of extension 138 by a gear train 140, which is coupled to the extensions by means of retainers 142. This nut torquing tool does not incorporate a torque limiter or a torque multiplier, but enables the tie rod nut 70 (see FIG. 1) to be torqued by an operator standing on the refueling bridge despite limited vertical access along the axis of the tie rod.

The nut torquing tool shown in FIG. 9 is used in conjunction with a reaction plate 144, which is installed between the wall 10 of the reactor pressure vessel and the upper support plates 62 of the upper support assembly (see FIG. 1). The reaction plate is wedged into position after the nut torquing tool has been positioned with tensioning nut 70 engaging the upper end of the tie rod. Reaction plate 144 has a pair of inverted U-shaped loops 146 which allow the plate to be suspended from a pair of ropes or wires and lowered into position from the refueling bridge. Plate 144 also has a slot 148 of width slightly greater than the diameter of extension 138 and a pair of cutouts 150 at the plate corners which interface with the upper support plates 62. The distance separating the cutouts 150 is slightly less than the distance separating the upper support plates 62 (best seen in FIG. 3B), which allows the reactor plate portion between the cutouts 150 to be placed between the upper support plates 62. During application of a torque on the handling pole, extension 138 would tend to orbit around the axis of extension 136 unless suitably restrained. In short order, extension 138 would bear against one of the upper support plates 62, causing the upper support assembly to twist. This is prevented by proper installation of the reaction plate. When radially outer surface 152 bears against the RPV wall 10, cutouts 150 abut the upper support plates 62, and extension 138 bears against the wall of slot 148, extension 138 is restrained and cannot be displaced to abut an upper support plate during the torquing operation.

The preferred embodiments of the nut torquing tool in accordance with the present invention have been disclosed for the purpose of illustration. Variations and modifications of the disclosed structure which fall within the concept of this invention will be readily apparent to persons skilled in the art of tooling design. For example, it will be apparent to the skilled practitioner that a gear train could be used as the drive system in place of the chain and sprocket arrangement. All such variations and modifications are intended to be encompassed by the claims set forth hereinafter.

We claim:

1. A tool for remotely torquing a nut having limited vertical access, comprising:

a pole adaptor for coupling to an end of a handling pole;

a drive shaft operatively coupled to said pole adaptor so that said drive shaft is rotated in response to rotation of said pole adaptor in a torquing mode;

first support means for rotatably supporting said drive shaft;

a nut driver for coupling to the nut to be torqued;

a driven shaft operatively coupled to said nut driver so that said nut driver is rotated in response to rotation of said driven shaft;

second support means for rotatably supporting said driven shaft;

a drive system for converting rotation of said drive shaft into rotation of said driven shaft, wherein an axis of rotation of said drive shaft and an axis of rotation of said driven shaft are parallel but not coaxial;

means for slidably coupling said first support means to said second support means for mutual sliding in a direction generally perpendicular to said axis of rotation in an unfastened state; and means for fastening said first support means relative to said second support means, thereby preventing said mutual sliding.

2. The tool as defined in claim 1, wherein said drive system comprises a first sprocket wheel mounted on said drive shaft, a second sprocket wheel mounted on said driven shaft and a chain coupled to said first and second sprocket wheels.

3. The tool as defined in claim 1, wherein said drive system comprises a gear train.

4. The tool as defined in claim 1, wherein said drive shaft is coupled to said pole adaptor via a universal joint.

5. The tool as defined in claim 1, wherein said drive shaft is coupled to said pole adaptor via a torque limiter.

6. The tool as defined in claim 1, wherein said drive shaft is coupled to said pole adaptor via a torque multiplier.

7. The tool as defined in claim 1, wherein said nut driver has a plurality of parallel projections arranged to slide and fit inside a corresponding plurality of parallel unthreaded holes in the nut.

8. A tool for remotely torquing a nut having limited vertical access, comprising:

a pole adaptor for coupling to an end of a handling pole;

a drive shaft operatively coupled to said pole adaptor so that said drive shaft is rotated in response to rotation of said pole adaptor in a torquing mode;

a nut driver for coupling to the nut to be torqued;

a driven shaft operatively coupled to said nut driver so that said nut driver is rotated in response to rotation of said driven shaft;

a drive system for converting rotation of said drive shaft into rotation of said driven shaft, wherein an axis of rotation of said drive shaft and an axis of rotation of said driven shaft are parallel but not coaxial, wherein said drive system comprises a first sprocket wheel mounted on said drive shaft, a second sprocket wheel mounted on said driven shaft and a chain coupled to said first and second sprocket wheels;

first and second bearings for rotatably supporting said drive shaft;

a first bracket supporting said first and second bearings;

third and fourth bearings for rotatably supporting said driven shaft;

a second bracket supporting said third and fourth bearings;

a stud having a threaded shaft engaged in a threaded hole in one of said first and second brackets, and having an unthreaded shaft engaged in an unthreaded hole in the other of said first and second brackets, whereby said first and second brackets are mutually translatable in a direction parallel to an axis of said stud, said stud axis being perpendicular to the axes of rotation of said drive shaft and said driven shaft; and a fastener for coupling said first bracket to said second bracket.

9. A tool for remotely torquing a nut having limited vertical access, comprising:

a pole adaptor for coupling to an end of a handling pole;

a drive shaft operatively coupled to said pole adaptor so that said drive shaft is rotated in response to rotation of said pole adaptor in a torquing mode;

a nut driver for coulping to the nut to be torqued;

a driven shaft operatively coupled to said nut driver so that said nut driver is rotated in response to rotation of said driven shaft; and a drive system for converting rotation of said drive shaft into rotation of said driven shaft, wherein an axis of rotation of said drive shaft and an axis of rotation of said driven shaft are parallel but not coaxial, wherein said nut driver has a plurality of parallel projections arranged to slide and fit inside a corresponding plurality of parallel unthreaded holes in the nut, and first and second screws which engage corresponding first and second threaded holes in the nut.

10. The tool as defined in claim 9, wherein said nut driver has a circular cylindrical axial recess for receiving an upper end of a tie rod when a nut carried by said nut driver is screwed onto a threaded portion of the tie rod upper end.

11. A tool for remotely torquing a nut having limited vertical access, comprising:

a pole adaptor for coupling to an end of a handling pole;

an extension member coupled to said adaptor for rotation therewith;

a drive shaft coupled to said extension member for rotation therewith;

a nut driver for coupling to the nut to be torqued;

a driven shaft coupled to said nut driver so that said nut driver is rotated in response to rotation of said driven shaft;

a first bearing for rotatably supporting said drive shaft;

a second bearing for rotatably supporting said driven shaft;

a sleeve bearing for rotatably and slidably supporting said extension member;

a support assembly for supporting said first and second bearings and said sleeve bearing, wherein an axis of rotation of said drive shaft and an axis of rotation of said driven shaft are parallel but not coaxial, and an axis of rotation of said sleeve bearing is coaxial with said axis of rotation of said drive shaft;

a drive system for converting rotation of said drive shaft into rotation of said driven shaft; and means for coupling said extension member to said drive shaft so that said extension member can translate axially relative to said drive shaft between upper and lower axial positions.

12. The tool as defined in claim 11, further comprising means for blocking rotation of said extension member relative to said support assembly when said extension member is in said upper axial position, but not when said extension member is in said lower axial position.

13. The tool as defined in claim 12, wherein said rotation blocking means comprise a plurality a projections supported by said support assembly and a corresponding plurality of recesses formed in a surface of said extension member which is transverse to said axis of rotation of said extension member.

14. The tool as defined in claim 11, wherein said drive shaft is coupled to said extension member via a torque multiplier.

15. A tool for remotely torquing a nut, comprising:

a pole adaptor for coupling to an end of a handling pole; and a nut driver coupled to said pole adaptor so that said nut driver rotates in response to rotation of said pole adaptor, wherein said nut driver comprises a plurality of unthreaded pins secured in a respective plurality of bores, and first and second screws having respective unthreaded portions slidably arranged in first and second unthreaded throughholes respectively.

16. The tool as defined in claim 15, wherein said nut driver has a circular cylindrical axial recess for receiving an upper end of a tie rod when a nut carried by said nut driver is screwed onto a threaded portion of the tie rod upper end.

17. The tool as defined in claim 15, wherein said first screw has a threaded portion extending below a lower limit of said first unthreaded throughhole.

18. The tool as defined in claim 15, further comprising an annular seat formed at an upper limit of said first unthreaded throughhole, and a compression spring arranged to surround a portion of said unthreaded portion of said screw with one end of said compression spring bearing against said annular seat and another end of said compression spring bearing against a head of said first screw.

19. The tool as defined in claim 15, further comprising:

a drive shaft operatively coupled to said pole adaptor so that said drive shaft is rotated in response to rotation of said pole adaptor in a torquing mode;

a driven shaft operatively coupled to said nut driver so that said nut driver is rotated in response to rotation of said driven shaft;

a drive system for converting rotation of said drive shaft into rotation of said driven shaft, wherein an axis of rotation of said drive shaft and an axis of rotation of said driven shaft are parallel but not coaxial; and a circular mounting plate to which said nut driver is mounted, said mounting plate being welded to said driven shaft.

20. The tool as defined in claim 19, further comprising:

first and second bearings for rotatably supporting said drive shaft;

a first bracket supporting said first and second bearings;

third and fourth bearings for rotatably supporting said driven shaft;

a second bracket supporting said third and fourth bearings;

a stud having a threaded shaft engaged in a threaded hole in one of said first and second brackets, and having an unthreaded shaft engaged in an unthreaded hole in the other of said first and second brackets, whereby said first and second brackets are mutually translatable in a direction parallel to an axis of said stud, said stud axis being perpendicular to the axes of rotation of said drive shaft and said driven shaft; and a fastener for coupling said first bracket to said second bracket.

* * * * *